W. J. MACKRELL.
Dovetail Grooved Brick for Plastering Purposes.
No. 208,186. Patented Sept. 17, 1878.
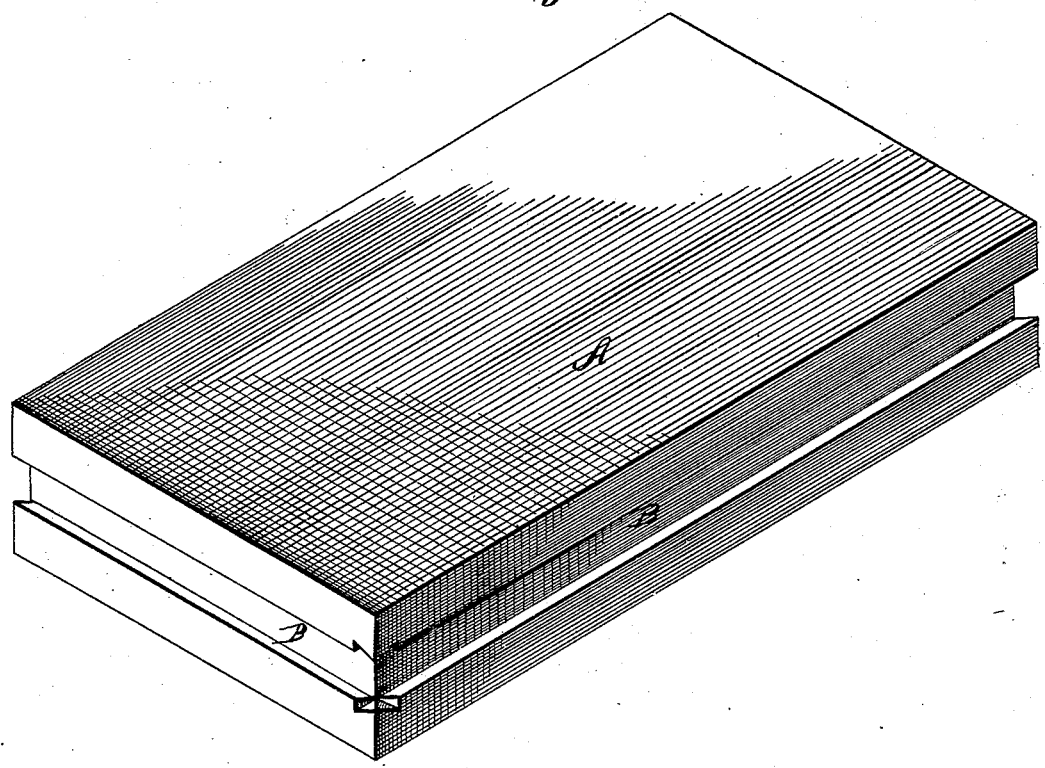
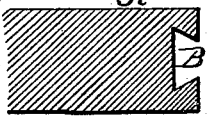
Witnesses:
Inventor:

UNITED STATES PATENT OFFICE.

WILLIAM J. MACKRELL, OF CLINTON, MASSACHUSETTS.

IMPROVEMENT IN DOVETAIL-GROOVED BRICKS FOR PLASTERING PURPOSES.

Specification forming part of Letters Patent No. 208,186, dated September 17, 1878; application filed August 21, 1878.

*To all whom it may concern:*

Be it known that I, WILLIAM J. MACKRELL, of Clinton, in the county of Worcester and State of Massachusetts, have invented certain new and useful Improvements in Dovetail-Grooved Bricks for Plastering Purposes; and I do hereby declare that the following is a full, clear, and exact description thereof, reference being had to the accompanying drawings, and to the letters of reference marked thereon, which form part of this specification, in which—

Figure 1 is a perspective view of my brick; Fig. 2, a cross-section through the groove.

The nature of my invention consists in the peculiar construction of a building-brick, as will be hereinafter more fully set forth.

In order to enable others skilled in the art to which my invention appertains to make and use the same, I will now proceed to describe its construction.

A is a brick of any desired form, in the edges of which is molded a dovetail groove, B.

This formation enables me to do away with the expense and labor of lathing in order to plaster a house, as the plaster will stick to the grooved brick as well as to laths. It also makes a fire-proof lathing, and saves a great deal of mortar, which is usually lost by passing between the laths and falling down behind them, and adds to the size of a room the space usually occupied by laths and studding.

I am aware that bricks have been constructed with two or more vertical dovetail grooves in their sides and ends, as shown in English Patent No. 11,236 of 1846. I do not therefore, of course, wish to be understood as laying any claim to such a device; but What I do claim, and desire to secure by Letters Patent, is—

A brick having a central longitudinal dovetail groove extending from one corner and along the front face to the rear corner diagonally from the starting-point, as and for the purpose set forth.

In testimony that I claim the foregoing as my own invention I affix my signature in presence of two witnesses.

WM. J. MACKRELL.

Witnesses:
MARCUS E. AMSDEN,
THOS. A. LELAND.